United States Patent [19]

Nagai et al.

[11] Patent Number: 4,563,322

[45] Date of Patent: Jan. 7, 1986

[54] METHOD AND APPARATUS FOR CONTINUOUSLY FILLING GROOVES IN SASH BARS WITH HEAT INSULATING MATERIAL

[75] Inventors: Yoshitaka Nagai; Nobushige Doguchi, both of Toyama, Japan

[73] Assignee: Yoshida Kogyo K.K., Tokyo, Japan

[21] Appl. No.: 564,025

[22] Filed: Dec. 21, 1983

[30] Foreign Application Priority Data

Dec. 25, 1982 [JP] Japan .................. 57-226544

[51] Int. Cl.$^4$ ............... B29D 27/04; B29C 13/02
[52] U.S. Cl. ................. 264/267; 264/331.11; 425/110; 425/117
[58] Field of Search ............ 264/267, 268, 269, 273, 264/279, 328.11, 331.11; 425/4 R, 110, 114, 117

[56] References Cited

U.S. PATENT DOCUMENTS

| Re. 28,084 | 7/1974 | Barker | 425/110 |
| 3,608,038 | 9/1971 | Smith | 264/273 |
| 3,832,264 | 8/1974 | Barnette | 264/273 |
| 3,952,402 | 4/1976 | Mengeringhousen | 264/267 |
| 4,024,007 | 5/1977 | Jago | 264/267 |
| 4,189,459 | 2/1980 | Jones | 264/267 |
| 4,354,304 | 10/1982 | Dixon | 264/269 |
| 4,381,907 | 5/1983 | Bischlipp et al. | 425/110 |

FOREIGN PATENT DOCUMENTS 2041255 9/1980 United Kingdom ............... 264/242

*Primary Examiner*—Donald Czaja
*Assistant Examiner*—Mary Lynn Fertig
*Attorney, Agent, or Firm*—Hill, Van Santen, Steadman & Simpson

[57] ABSTRACT

A method and an apparatus for continuously filling grooves in metal sash bars with heat insulating synthetic resin are disclosed. The method comprises the steps of closing the opposite ends of the groove of each of the metal sash bars by end caps each having an end wall with a thinned top edge; continuously moving the metal sash bars through a path below an injection device with the grooves facing upwardly and with at least the top edges of the end caps of one preceding sash bar and the succeeding sash bar in close contact with each other on the upstream of the injection device; and continuously injecting a solution of the heat insulating synthetic resin from the injecting device into the grooves of the sash bars at a constant injecting rate while continuously moving the sash bars.

The apparatus comprises: a means for attaching end caps to opposite ends of the groove of each of the metal sash bars to close the opposite ends, the cap each having an end wall with a thinned top edge; and injection device positioned downstream of the cap attaching means for continuously injecting a solution of the heat insulating synthetic resin; a feed device positioned near the injection device for continuously moving the sash bars along a path below the injection device with the grooves facing upwardly; and a rapid feed device positioned upstream of the feed device for moving a succeeding sash bar toward the preceding sash bar which is being injected with the solution of heat insulating synthetic resin at a higher rate than that by the feed device so that at least the top edges of the end caps of the preceding sash bar and the succeeding sash bar are in close contact with each other.

5 Claims, 14 Drawing Figures

METHOD AND APPARATUS FOR CONTINUOUSLY FILLING GROOVES IN SASH BARS WITH HEAT INSULATING MATERIAL

BACKGROUND OF THE INVENTION

This invention relates to a method and an apparatus for continuously filling grooves in metal sash bars with heat insulating material in the manufacturing of heat insulating sash bars.

It has been known that heat insulating sash bars are continuously produced by filling each groove in extruded hollow metallic sash bars with heat insulating synthetic resin. In the production of such products, after the groove in one sash bar is filled with heat insulating synthetic resin and before the groove in the succeeding sash bar is filled with heat insulating synthetic resin, the resin filling operation has to be temporally interrupted, since the two sash bars are spaced apart from each other. However, it is not easy to determine the timing for interrupting the filling operation for optimum volume and the flow rate in the starting of the next filling operation tends to vary, resulting in uneven filling. To avoid such disadvantages, there has been proposed an approach by which a tray is disposed below the filling zone to receive any excess of synthetic resin which has been poured into the space between the successive sash bars and which has not been filled into the sash bars while the synthetic resin is continuously poured and the excess resin is then discharged out of the system. However, this approach does not allow the excess resin to be reused and is, therefore, very wasteful.

SUMMARY OF THE INVENTION

It is, therefore, a primary object of the present invention to provide a method and an apparatus for filling grooves in metal sash bars with heat insulating material which allows a continuous resin filling operation without wasting any excess resin.

Another object of the present invention is to provide the method and the apparatus for filling grooves in metal sash bars with heat insulating material which can achieve the above object by means of simple modification of the conventional method and apparatus.

According to the present invention, a method for continuously filling grooves in metal sash bars with heat insulating synthetic resin comprises the steps of: closing the opposite ends of said groove of each of said metal sash bars by end caps or members each having an end wall including a thinned top edge; continuously moving said metal sash bars through a path below an injection device with the grooves facing upwards and with at least said top edges of said end caps of one preceding sash bar and the succeeding sash bar being in close contact with each other at the upstream of said injection device; and continuously injecting a solution of said heat insulating synthetic resin from said injecting device into said grooves of said sash bars at a constant rate of injection while continuously moving said sash bars.

Also, according to the present invention, an apparatus for continuously filling grooves in metal sash bars with heat insulating synthetic resin comprises: a means for attaching end caps to opposite ends of said groove of each of said metal sash bars to close said opposite ends, said caps each having an end wall including a thinned top edge; an injection device positioned downstream of said cap attaching means for continuously injecting a solution of said heat insulating synthetic resin; a feed device positioned near said injection device for continuously moving said sash bars along a path below said injection device with said grooves facing upwards; and a rapid feed device positioned upstream of said feed device for moving one succeeding sash bar toward the preceding sash bar which is being injected with said solution of heat insulating synthetic resin at a higher rate than that by said feed device so that at least said top edges of said end caps of the preceding sash bar and the succeeding sash bar are in close contact with each other.

In the method and apparatus of this invention, since the sash bars are fed continuously with the edges of the end caps of the preceding and succeeding sash bars being in close contact with each other, the continuous resin filling operation can be effected without wasting any excess resin. The sash bars which have been filled with the resin are not bonded to each other, because hardly any resin is deposited on the thinned top edges of the end caps. Even though a little resin may be deposited on the top edges, the sash bars are easily separated. The modification of the conventional method and the apparatus is very simple, because the above objects are achieved by providing the thinned top edge on the end cap and by feeding the sash bars end to end in close contact with each other.

Many other advantages, features and additional objects of the present invention will become apparent to persons skilled in the art upon making reference to the following description and the accompanying drawings which show preferred embodiments of the present invention by way of illustrative example.

DETAILED DESCRIPTION OF THE PREFERRED EMBODIMENTS

Figure 1:
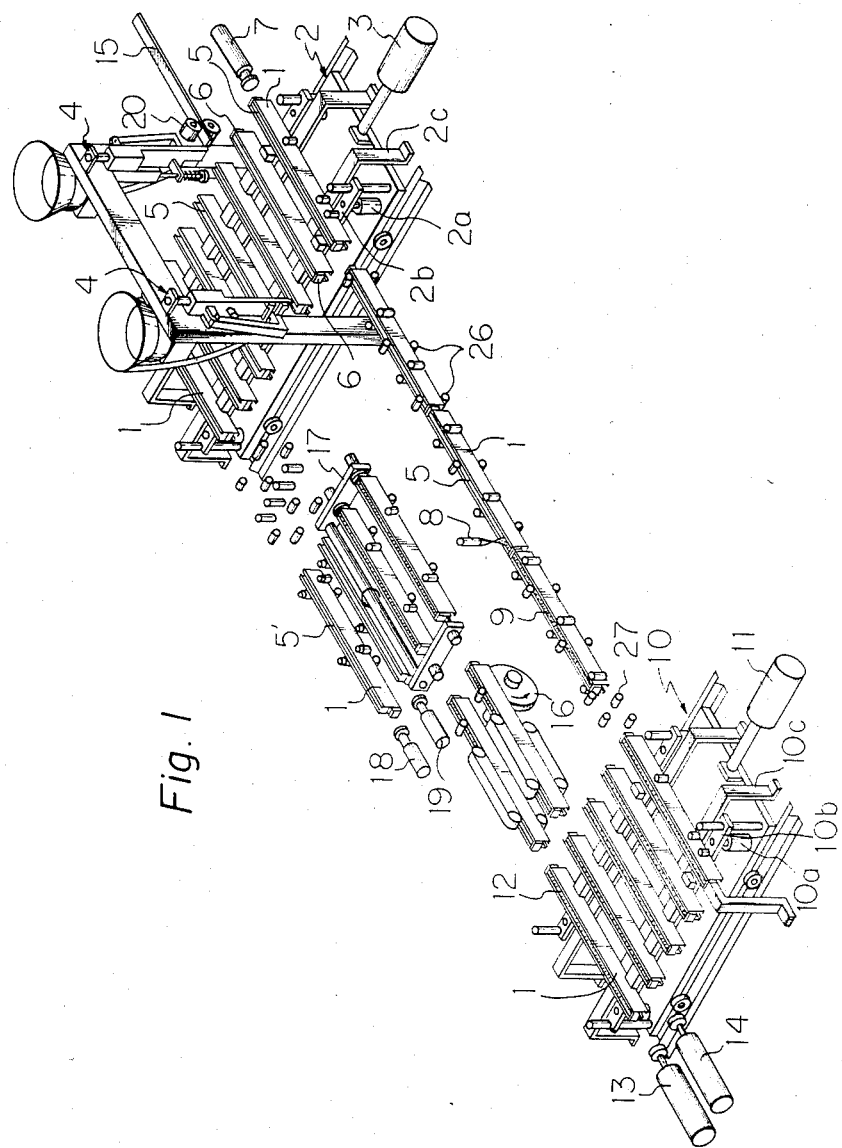
FIG. 1 is a perspective view of the entire structure of an apparatus suitably employed for explaining one embodiment of the present invention.

FIG. 1 is a perspective view of the entire structure of the apparatus for continuously producing sash bars incorporating the invention. A plurality of extruded hollow sash bars 1 are placed on a first carriage 2 one by one at a predetermined time interval by a supplying means not shown. The first carriage 2 includes a movable stand 2b which is moved up and down by a cylinder 2a and is reciprocated transversely of the apparatus by a cylinder 3 and a fixed stand 2c. When the piston rod of the cylinder 2a is extended, the sash bars 1 on the fixed stand 2c are engaged by spacers of the movable stand 2b, are lifted from the fixed stand 2c, and are positioned at an equal pitch or space. Under this condition, when the piston rod of the cylinder 3 is retracted, the sash bars 1 are moved transversely by one pitch together with the movable stand. When the piston rod of the cylinder 2a is retracted, the sash bars 1 are removed from the spacers of the movable stand and are placed on the fixed stand 2c. With such condition, when the piston rod of the cylinder 3 is extended, the movable stand 2b is returned transversely to its original position for receiving a newly supplied sash bar.

While the sash bars 1 are being moved intermittently on the carriage 2, a heat insulating sheet 15 is inserted into the groove 5 in each of the successive bars 1 by supply rollers 20 and then the opposite ends of the groove 5 are closed by end caps 6 by a cap attaching device 4. The sash bars 1 with the grooves 5 closed by the end caps are successively pushed out of the carriage 2 longitudinally of the apparatus by a cylinder 7 and passed below an injection device 8 which injects a solution of heat insulating synthetic resin into the grooves 5 in the sash bars 1 one by one.

The sash bars 1 with the heat insulating synthetic resin 9 filled in the grooves 5 are then transferred by feed rollers 27 onto a second carriage 10 which is similar to the first carriage 2 and moved intermittently one pitch or space at a time on a fixed stand 10c of the carriage 10 by a movable stand 10b, and cylinders 10a, 11 while allowing the resin solution 9 to solidify during such movement to form a heat insulating synthetic resin body 12.

Thereafter, each two of the thus processed bars 1 are at one time simultaneously pushed out of the second carriage 10 longitudinally of the apparatus onto a cutter device 16 by two cylinders 13, 14 and portions of the bottoms of the grooves 5 are cut away by the cutter device 16 [see FIG. 2(e)]. Thereafter, the sash bars 1 are transferred longitudinally of the apparatus by a roller drive means not shown to a reversing device 17 which holds and turns the sash bars 1 upside-down to place the lower grooves 5' of the sash bars to face upwardly. The reversed bars 1 are then pushed out of the device 17 longitudinally of the apparatus by two cylinders 18, 19 to be again placed onto the first carriage 2 where the now upwardly facing grooves 5' of the bars 1 are successively fitted with the end caps 6 lined with the heat insulating sheet 15 and thereafter filled with the heat insulating synthetic resin 9 at the injecting zone in the same manner as the processing of the grooves 5. The sash bars 1 with the heat insulating synthetic resin filled in the grooves 5' are then transferred onto the second carriage 10 and are removed from the downstream end of the second carriage by a removing means not shown.

Figure 2:
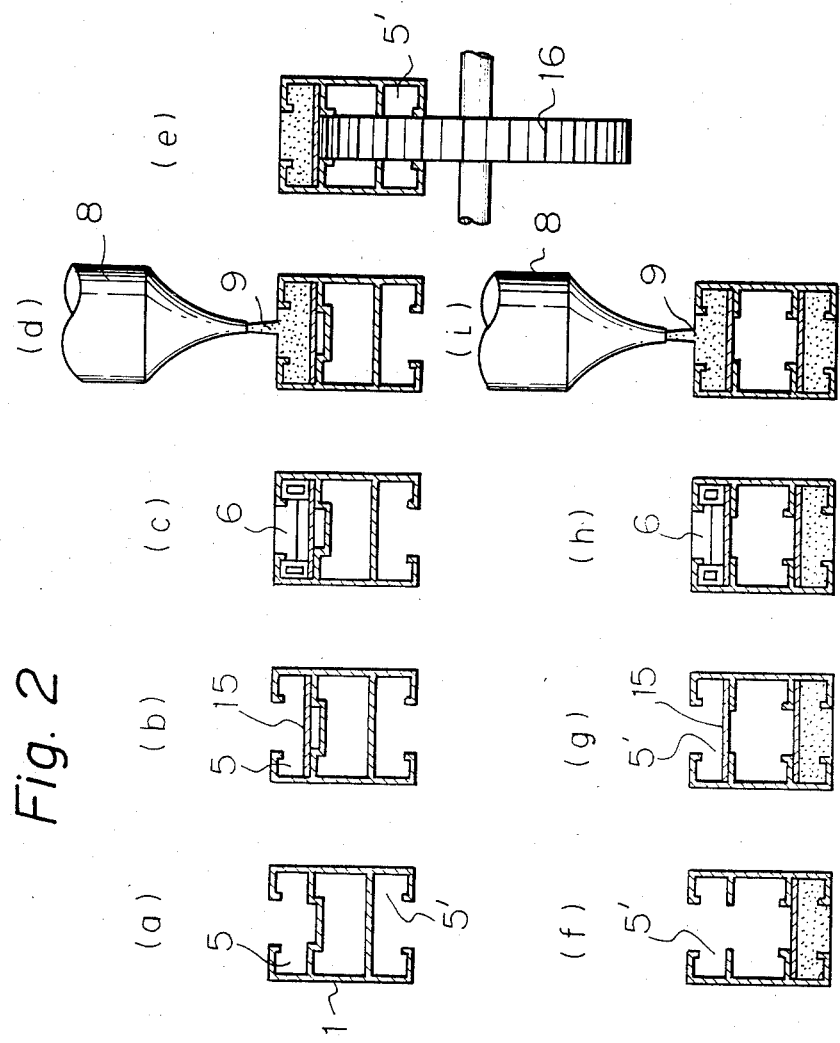
FIG. 2 is a view showing the various steps in the method of the invention to be conducted by the apparatus of FIG. 1.

FIG. 2 shows the sash bars 1 in cross-section in the successive processing steps in the order mentioned hereinabove. The sash bar 1 has the cross-sectional configuration as shown in FIG. 2(a) when extruded. In the process, at first, the sheet 15 is placed onto the bottom of the upper groove 5 of the sash bar 1 as shown in FIG. 2(b), then the opposite ends of the upper groove 5 are closed by end caps 6 and the sheet 15 is held in position by nipping it between the portion of the cap and the bottom of the groove 5 as shown in FIG. 2(c), the solution of heating insulating synthetic resin 9 is injected into the upper groove 5 by the injection device 8 as shown in FIG. 2(d), the central portions of the bottoms of the upper and lower grooves 5, 5' are cut away by the cutter device 16 as shown in FIG. 2(e), the sash bar 1 is turned upside-down to reverse the position of the upper and lower grooves 5, 5' as shown in FIG. 2(f), the sheet 15 is placed onto the bottom of the now upwardly facing groove 5' as shown in FIG. 2(g), the opposite ends of the now upwardly facing groove 5' are closed by end caps 6 and the sheet 15 is held in position within the groove 5' as shown in FIG. 2(h) and the solution of heat insulating synthetic resin 9 is injected into the groove 5' by the injecting device 8 as shown in FIG. 2(i).

Figure 3:
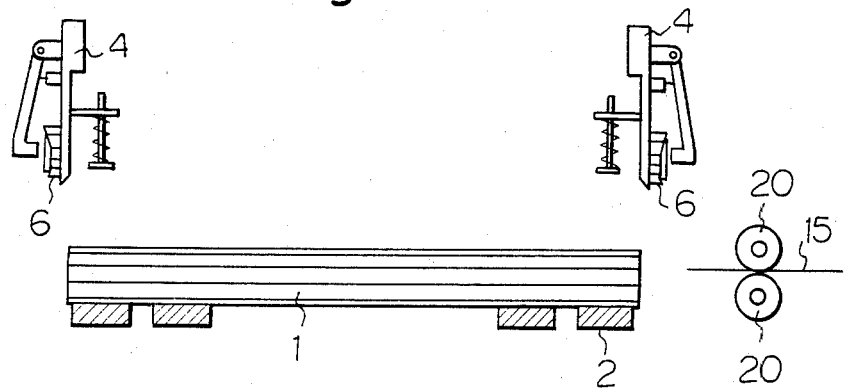
FIGS. 3 through 7 are elevational views showing the successive steps in the closing of the groove of a sash bar by the end cap.

FIGS. 3 through 7 show the successive steps in the end cap attaching operation. As shown in FIG. 3, the sash bar 1 is placed on the first carriage 2, end cap attaching devices 4 are positioned above the opposite ends of the sash bar 1 and a supply roller 20 for the sheet 15 is positioned adjacent to the right-hand end of the bar 1.

Figure 4:
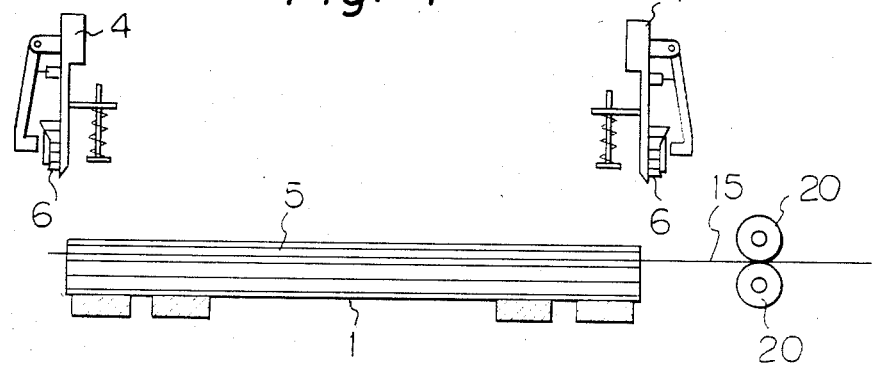

FIG. 4 shows the step wherein the sheet or strip 15 is supplied into the groove 5 by the supply roller 20. The supplying of the sheet 15 is stopped at the position where the leading end of the sheet 15 slightly projects from the left-hand end of the sash bar 1.

Figure 5:
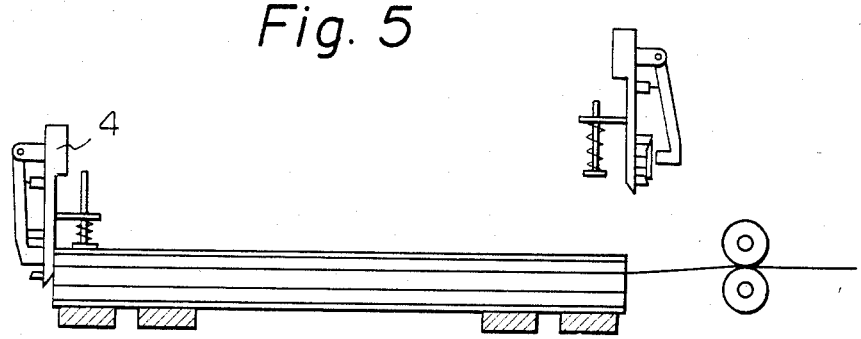

FIG. 5 shows the step wherein the cap attaching device 4 on the left-hand side is lowered to attach the end cap 6 to the left-hand end of the groove 5 so as to close the end of the bar 1.

Figure 6:
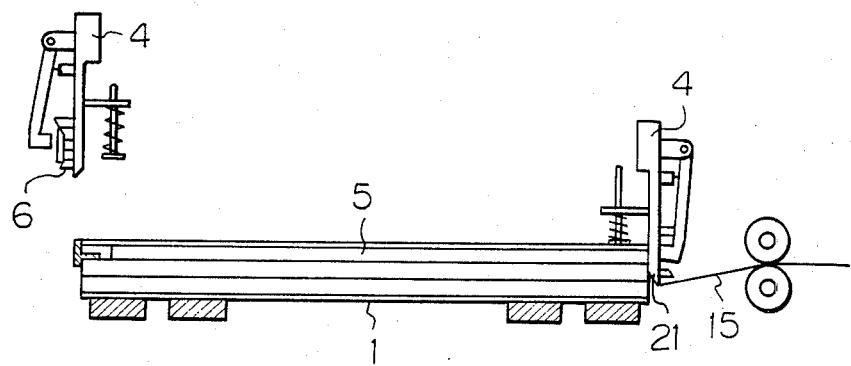

FIG. 6 shows the step wherein the end cap attaching device 4 of the left-hand side is raised upwardly and the end cap for use in the successive sash bar is supplied thereto and the end cap attaching device 4 of the right-hand side is lowered to attach the end cap 6 to the right-hand end of the groove 5 to close the same end. At this time, the blade 21 at the lower end of the end cap attaching device 4 cuts the right-hand end of the sheet 15 from the rest of the sheet.

Figure 7:
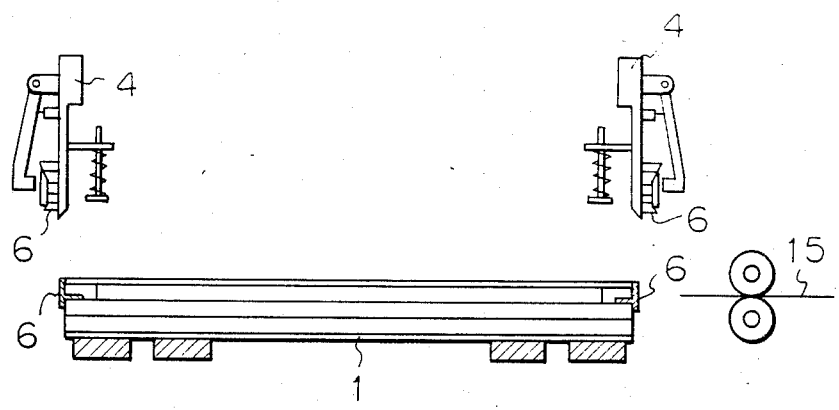

FIG. 7 shows the step wherein the closing of the opposite ends of the groove 5 by the end caps 6 is completed, the end cap attaching device 4 of the right-hand side is raised upwardly and the next end cap 6 for use in the next sash bar 1 is supplied thereto.

Figure 8:
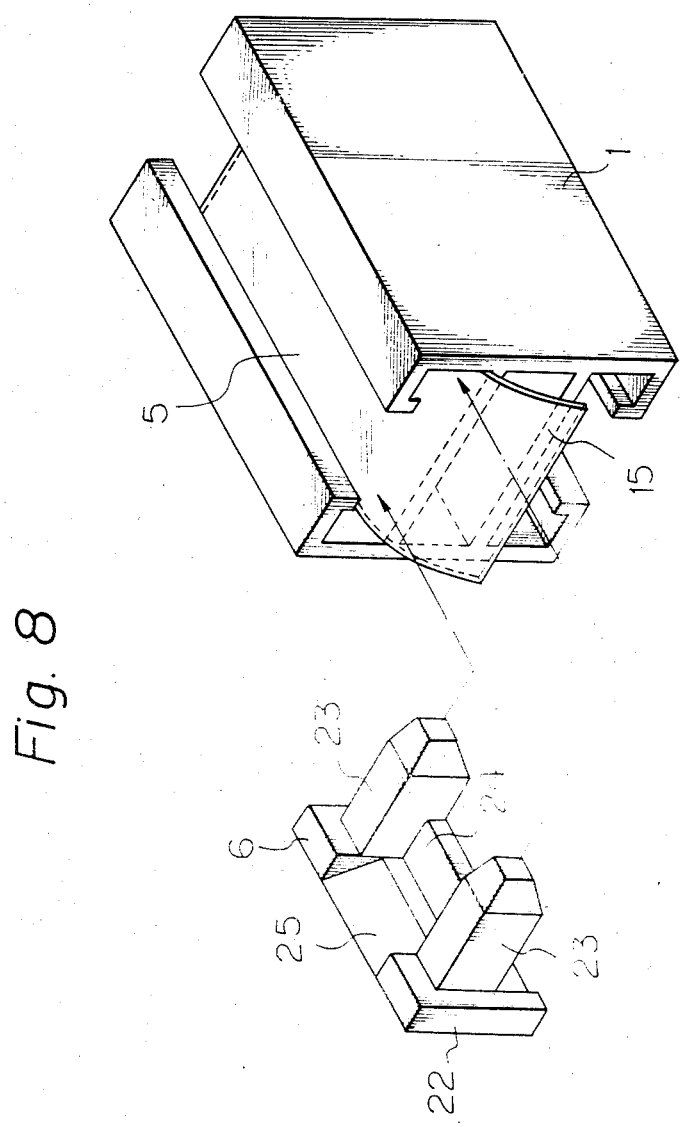
FIG. 8 is an enlarged perspective view showing the manner by which the groove is closed by the end cap.

FIG. 8 is a perspective view which shows how to attach the end cap 6 to the groove 5 in the sash bar 1.

The illustrated end cap 6 is only one example and the outer surface of the end wall 22 of the end cap 6 which closes the associated end of the groove 5 is in the vertical plane and the inside of the end cap is formed with a pair of projections 23 adapted to be fitted within the opposite side portions of the groove 5. The opposite projections 23, 23 are connected together by a web 24 at the bottoms of the projections. The portion of the inner surface of the wall 22 above the web 24 is provided with a slope 25 which slopes downwardly from the top edge of the outer face of the end wall 22. The end cap 6 having the abovementioned configuration is fitted into the adjacent end of the groove 5 with the end of the sheet 15 slightly projecting outwardly from the groove as shown by the arrows so as to close the groove end and simultaneously hold the sheet 15 in position.

The injection of the solution of heat insulating synthetic resin 9 into the groove 5 with the opposite ends thereof closed by the end caps will now be described in detail referring to FIGS. 9 through 13.

Figure 9:
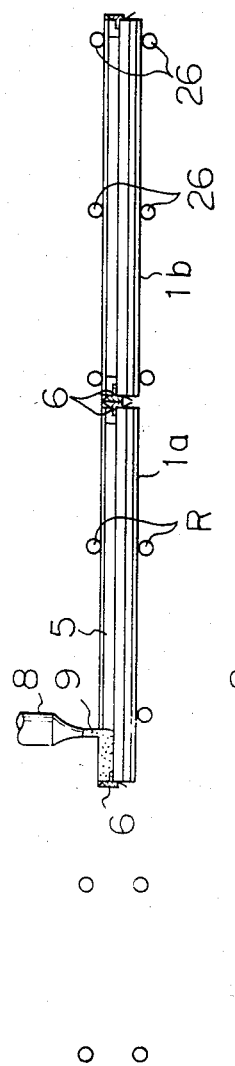
FIGS. 9 through 12 are elevational views showing the successive steps in the filling of heat insulating synthetic resin.

FIG. 9 shows the initial stage of the injection of the solution of heat insulating synthetic resin 9 into the groove 5 by the injection device 8. At this stage, the preceding sash bar 1a which is being filled with the solution of the heat insulating synthetic resin 9 is fed at an appropriate constant speed by feed rollers R provided near the injection device 8, while the succeeding sash bar 1b is fed by rapid feed rollers 26 provided upstream of the feed rollers R. The feed rollers R clamp the sash bar 1a with rather strong force while the rapid feed rollers 26 clamp the sash bar 1b loosely. Therefore, when the succceeding sash bar 1b has reached and is in contact with the preceding sash bar 1a, these sash bars 1a, 1b are fed at said appropriate constant speed with the adjacent outer ends of the sash bars in close contact with each other.

Figure 10:
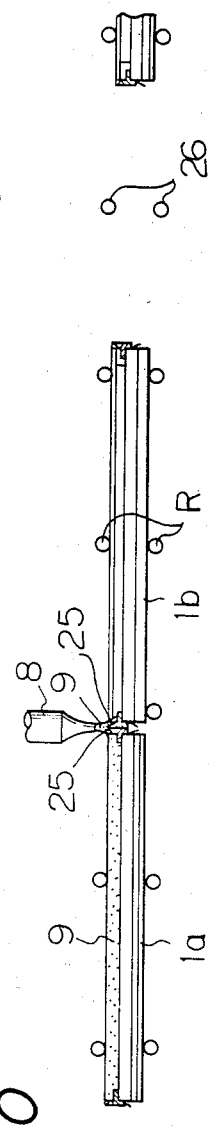

FIG. 10 shows the stage where the first sash bar 1a has been filled with the solution of heat insulating synthetic resin 9 therein and the filling of the solution is shifted to second sash bar 1b. However, at such a time, the solution of heat insulating synthetic resin 9 is distributed into the grooves 5, 5 in the two sash bars 1a, 1b by means of the slopes 25 on the end caps 6 which are in back to back contact.

Figure 13:
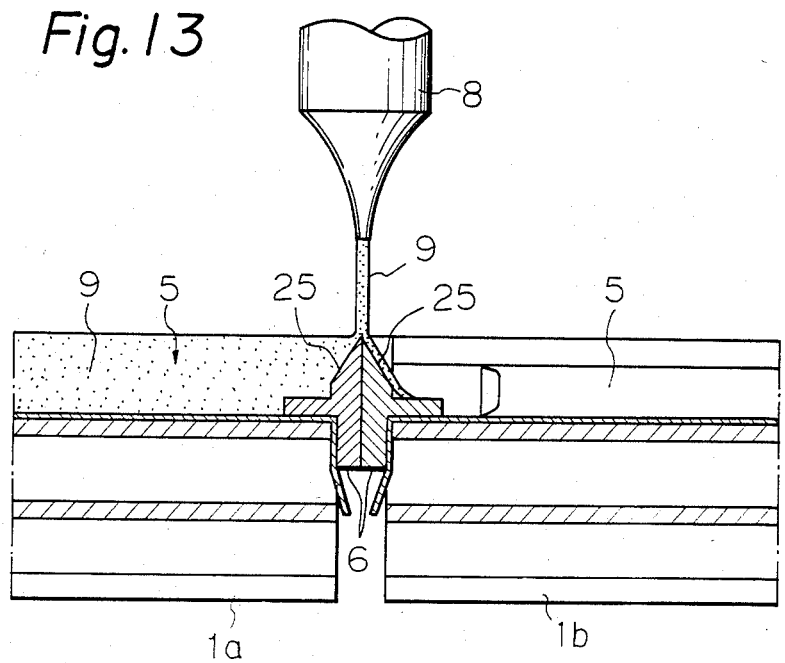
FIG. 13 is an enlarged cross-sectional view showing the distribution of heat insulating resin into the grooves of the adjacent sash bars.

As will be described later by referring to FIG. 13, when the preceding and succeeding sash bars 1a, 1b are closely positioned with the outer surfaces of the adjacent end caps 6 in close contact with each other, the slopes 25 of the adjacent end caps 6 form a wedge-like configuration projecting upwardly. Thus, the injected solution of heat insulating synthetic resin 9 is distributed along the wedge into the grooves 5, 5 in the two sash bars 1a, 1b so that the resin solution will not spill over the sash bars 1a, 1b.

Figure 11:
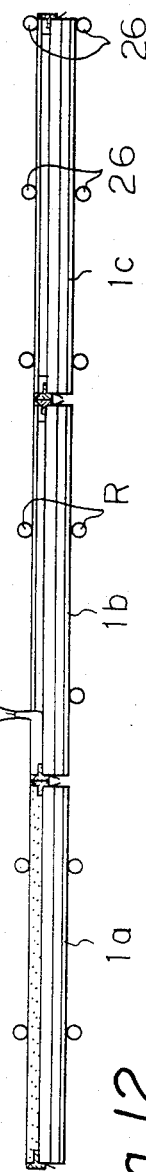

FIG. 11 shows the stage where the injection of the solution of heat insulating synthetic resin 9 into the preceding sash bar 1a was completed and the injection of the resin solution into the succeeding sash bar 1b has just started. At this time, a third sash bar 1c is fed by rapid feed rollers 26 so that the end cap 6 at the leading end of the third bar 1c contacts the end cap 6 at the trailing end of the second sash bar 1b back to back as in the case of sash bars 1a, 1b stated above.

Figure 12:
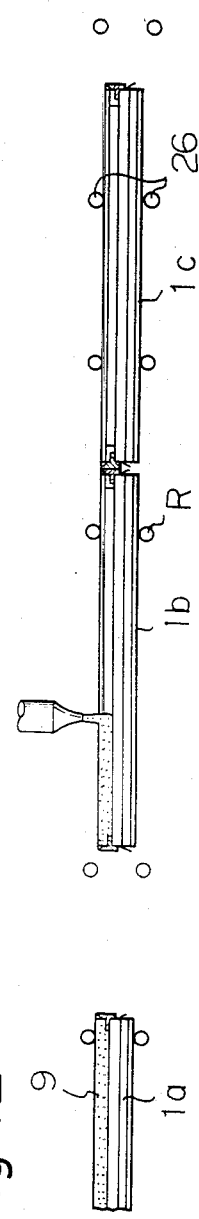

FIG. 12 shows a further progression of the operation. In this stage, the sash bar 1a with the groove 5 filled with the solution of heat insulating synthetic resin 9 is transported towards the second carriage 10 by rapid feed rollers 27 (FIG. 1) so that the preceding or processed sash bar 1a leaves the succeeding sash bar 1b.

Figure 14:
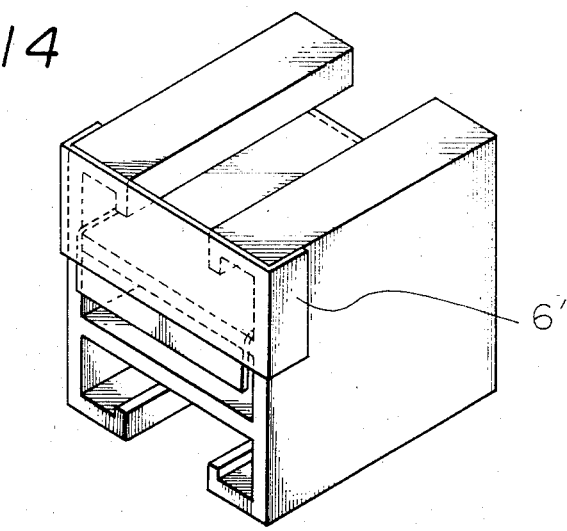
FIG. 14 is a perspective view showing an alternative closing cap of the groove.

In the foregoing, although, description has been made of the particular end cap 6 having the particular configuration shown in FIG. 8, such an end cap is only one example of embodiment of the invention. A thin adhesive tape piece 6' adapted to be stuck on the end of the sash bar to close the qroove also can be used as an end cap as shown in FIG. 14.

Furthermore, in the foregoing, although it has been described that the sash bar 1 is turned upside-down to fill both the upper and lower grooves 5, 5' with the solution of heat insulating synthetic resin 9, it is not always necessary to fill the two grooves in one sash bar, and the filling of only one groove with the resin solution may be satisfactory.

With the above-mentioned construction and arrangement of the components of the apparatus of the invention, the filling of the solution of heat insulating resin in the grooves of successive sash bars can be made continuously while preventing spilling out of the resin solution over the edge of the grooves which would result in waste of the resin. Since the thickness of the top edges of the end caps of the adjacent sash bars contacting each other are reduced, hardly any resin solution can be deposited on the top edges. Even though a small amount of the resin solution may be deposited on the top edges, the sash bars can be easily separated from each other with a slight force requiring no special tooling, because it is sufficient to separate only the thinned top edges for that purpose.

Also, in the apparatus of the invention, since the rapid feed means are positioned between the first carriage and the injection device to feed the succeeding sash bar, the sash bar which has been transferred from the first carriage is positioned in end-to end contacting relationship at the upstream of the injection device so that continuous filling of the solution of the heat insulating resin can be effected in conjunction with the specific configuration of the end cap.

The present invention is advantageously used for the production of heat insulating sash products and the like.

We claim:

1. A method for continuously filling grooves in metal sash bars with heat insulating synthetic resin which comprises:

closing the opposite ends of said groove of each of said metal sash bars with an end cap having a thinned top edge;

continuously moving said metal sash bars one after another through a path below an injection device with the grooves facing upwardly and with at least said top edges of said end caps of the preceding sash bar and the succeeding sash bar being in close contact with each other on the upstream of said injection device by moving the bar beneath the injection device at a first speed and by moving the succeeding sash bar at a rapid second speed higher than the first speed until the end cap of the leading end makes contact with the end cap of the trailing end of the sash bar moving at the first speed, then moving both of the bars at the first speed; and continuously injecting a solution of said heat insulating synthetic resin from said injection device into said grooves of said sash bars at a constant injecting rate while continuously moving said sash bars one after another along the path therebelow.

2. An apparatus for continuously filling grooves in metal sash bars with heat insulating synthetic resin which comprises:

means for attaching end caps to opposite ends of said grooves of each of said metal sash bars to close said opposite ends, said cap each having an end wall including a thinned top edge;

an injection device positioned downstream of said cap attaching means for continuously injecting a solution of said heat insulating synthetic resin;

a first feed device positioned near said injection device for continuously moving said sash bars along a path below said injection device with said grooves facing upwardly; and a rapid second feed device positioned upstream of said first feed device for moving a succeeding sash bar toward the preceding sash bar which is being injected with said solution of heat insulating synthetic resin at a higher rate than that by said first feed device so that at least said top edges of said end caps of the preceding sash bar and the succeeding sash bar are in close contact with each other.

3. The apparatus according to claim 2, wherein the outer surface of said end wall is in a vertical plane, the inside of said end wall is formed with a pair of projections adapted to be fitted into the opposite side portions of said groove, said pair of projections being connected by a web at the bottom of said projections, and the inside of said end wall above said web being provided with a slope which slopes downwardly from the top edge of the vertical outside face of said end wall.

4. The apparatus according to claim 2, wherein said end cap is a thin adhesive tape piece adapted to be stuck on said end of said sash bar.

5. An apparatus for continuously filling grooves in metal sash bars with heat insulating synthetic resin which comprises:
  means for closing the opposite ends of said groove of each of said metal sash bars by attaching end caps having end walls with a thinned top edge;
  means for continuously injecting a solution of heat insulating synthetic resin including an injection device being positioned downstream of the means for closing; and
  means for continuously moving said metal sash bars one after another through a path below said injection device with the grooves facing upwardly and with at least said top edges of said end caps of the preceding sash bar and the succeeding sash bar being in close contact with each other on the upstream of said injection device, said means for continuously moving including a first feed device and a rapid second feed device, said first feed device being positioned near the injection device to move the sash bars beneath the injection device at a first speed and said second feed device being positioned upstream of the first device and moving the succeeding sash bar toward the preceding sash bar which is receiving a solution from the injection device at a higher rate of speed until a leading end of the succeeding bar contacts a trailing end of the preceding bar, said second feed device then advancing the succeeding bar at said first speed so that both bars move at the first speed beneath the injection device and the groove of the sash bars moving in the path below the means for injecting are filled with the solution one after the other.

* * * * *